United States Patent
Lou et al.

(10) Patent No.: US 6,370,666 B1
(45) Date of Patent: Apr. 9, 2002

(54) TUNING SCHEME FOR ERROR-CORRECTED BROADCAST PROGRAMS

(75) Inventors: Hui-Ling Lou; Rudiger L. Urbanke, both of Murray Hill; Vijitha Weerackody, Watchung, all of NJ (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/203,663

(22) Filed: Dec. 2, 1998

(51) Int. Cl.[7] .......................... H03M 13/00; H04L 1/18
(52) U.S. Cl. ................... 714/751; 714/746; 714/755
(58) Field of Search ................... 714/751, 746, 714/752, 755; 455/91, 120

(56) References Cited

U.S. PATENT DOCUMENTS 6,247,156 B1 * 6/2001 Kim ........................... 71/755

OTHER PUBLICATIONS

M. T. Orchard et al., Redundancy Rate–Distortion Analysis of Multiple Description Coding, proc. IEEE Int. Conf. on Image Processing 1997.

J. Herre, et al., "The Integrated Filterbank Based Scalable MPEG–4 Audio Coder", 105th Audio Engineering Society Convention (Sep. 1998).

* cited by examiner

Primary Examiner—Phung M. Chung
(74) Attorney, Agent, or Firm—Law Office of Leo Zucker

(57) ABSTRACT

First and second source signal streams each associated with a program source are produced. A first error correction code having a first correction delay is applied to the first source signal stream, thus producing a first error-corrected source signal stream that is transmitted for reception by a receiver. A tuning signal stream corresponding to the second source signal stream is transmitted for reception by the receiver at a determined timing relative to transmission of the first error-corrected signal stream. When first tuning to a program transmission channel, the receiver initially processes the tuning signal to obtain at least a recognizable reproduction of the program source, with little if any delay attributable to error correction coding of the first source signal stream.

26 Claims, 6 Drawing Sheets

TUNING SCHEME FOR ERROR-CORRECTED BROADCAST PROGRAMS

BACKGROUND OF THE INVENTION

1. Field of the Invention

This invention relates generally to broadcasting of programs that are coded to help correct received signal errors, and particularly to a scheme that allows a receiver to reproduce a selected program when first tuning to the program with little if any delay caused by such coding.

2. Discussion of the Known Art

Wireless broadcast program signals are subject to fading, or loss of portions of the signals, during transmission of the signals to a broadcast receiver. For example, for radio program signals broadcast in the frequency modulation (FM) band of 88 MHz to 18 MHz, and with no direct line-of-sight path to the receiver, so-called Rayleigh fading occurs wherein parts of a transmitted signal stream may be subject to deep nulls in strength by the time the signals reach the receiver. Shadow fading may also occur when the transmitted signal is blocked by large structures such as buildings and bridges, and when a mobile receiver is beneath an overpass or in a tunnel. If program signals are broadcast in the form of packets of digital bits or symbols, then the packets or portions thereof are likewise subject to loss over a transmission path because of fading. In digital network (e.g., Internet) broadcasting, a signal bit stream corresponding to a program source is also divided into many packets, some of which may be lost or delayed during transmission through either wired or wireless portions of the network.

In digital broadcasting applications, feedback or re-transmission of lost symbols or packets are not desirable solutions, because of the nature of the broadcasting environment. One viable solution to combat fading or packet loss in a broadcast environment, is the use of forward error correction (FEC) schemes referred to as convolutional and block coding. These schemes protect the transmitted streams of source signals so that even if part of a signal stream is received with error, the error may be corrected or minimized using other transmitted information which is received under more favorable conditions.

Known block codes such as, e.g., Reed-Solomon (RS), Golay, BCH and the like, operate to correct errors occurring from relatively short noise or interference bursts over a signal transmission path. Depending on an amount of redundancy added to a source signal stream and a selected code block size, a given block code will allow up to a certain number of symbol errors to be corrected at the receiver.

Convolutional codes can work well to minimize reception errors due to relatively slow fading, provided appropriate interleaving (i.e., scrambling of a signal stream over a certain time interval) is also employed. In order for convolutional codes to work properly, consecutive symbols presented to a signal channel decoder at the receiver should be uncorrelated. For example, the consecutive symbols should be separated timewise from one another during transmission, such as occurs by interleaving. Accordingly, at the transmitter, an interleaver is typically used to scramble symbols from the source signal stream over a certain interleaver time delay or length, after the symbols have been subjected to block coding. The block-coded and interleaved symbols are then transmitted over, e.g., an assigned wireless broadcast frequency channel. At the receiver, received symbols are first de-interleaved, and then applied to a channel decoder.

Depending on Doppler effects on the signal transmission path, interleaving over a large number of signal symbols is often necessary for the entire transmission and reception process to work effectively. A large interleaver length will, however, result in large time delays when first tuning the receiver to a broadcast program, since decoding and reproduction of the original program source can start only after an entire interleaved packet has been buffered or stored at the receiver.

If block-coded symbols are interleaved over the duration of many blocks before transmission, symbols associated with a lost packet will be de-interleaved and found among many different coded blocks. Thus, the number of symbol errors that may occur in each coded block is reduced, and the likelihood that a selected block code will correct all symbol errors in a transmitted signal stream is correspondingly increased.

While a delay of as much as several seconds between signal reception and program reproduction at the receiver may go unnoticed by a user as long as the receiver remains tuned to one program, such delay can be intolerable when first tuning the receiver to select a program, or while re-tuning to select a different program. Then, delays of at most a fraction of a second may be tolerable. Thus, while large interleaver/de-interleaver lengths help to ensure that a program source signal stream is transmitted, received, decoded and reproduced with minimum error due to fading and noise, the interleaver lengths must be relatively short if program decoding delays at the receiver are to be minimized while the receiver is being tuned or switched among different programs.

SUMMARY OF THE INVENTION

A technique is provided that allows a receiver to reproduce a program source with minimal delay when the receiver is first tuned to the program source.

Broadly, accordingly to the invention, two signal streams associated with a program source are subjected to different delays resulting from error correction coding. A first source signal stream is subjected to a first correction delay to overcome expected signal errors for a given transmission channel. A second source signal stream is subjected to a second correction delay shorter than the first correction delay, or substantially no delay, to facilitate reproduction of the program source with minimal delay at a receiver when the receiver is first tuned to the transmission channel.

According to another aspect of the invention, a method of transmitting signals corresponding to a program source in a manner that facilitates reproduction of the program source with minimal delay at a receiver, includes interleaving a first signal stream associated with the program source using a first interleaver having a first length to overcome expected signal errors for a given transmission channel, thus producing a first interleaved signal stream, and interleaving a second signal stream associated with the program source using a second interleaver having a second length less than the first length of the first interleaver to facilitate reproduction of the program source with minimal delay at a receiver when the receiver is first tuned to the program source, thus producing a second interleaved signal stream. The interleaved signal streams are transmitted simultaneously with a determined timing relative to one another for reception by a receiver.

For a better understanding of the invention, reference is made to the following description take in conjunction with the accompanying drawing and the appended claims.

DETAILED DESCRIPTION OF THE INVENTION

Figure 1:
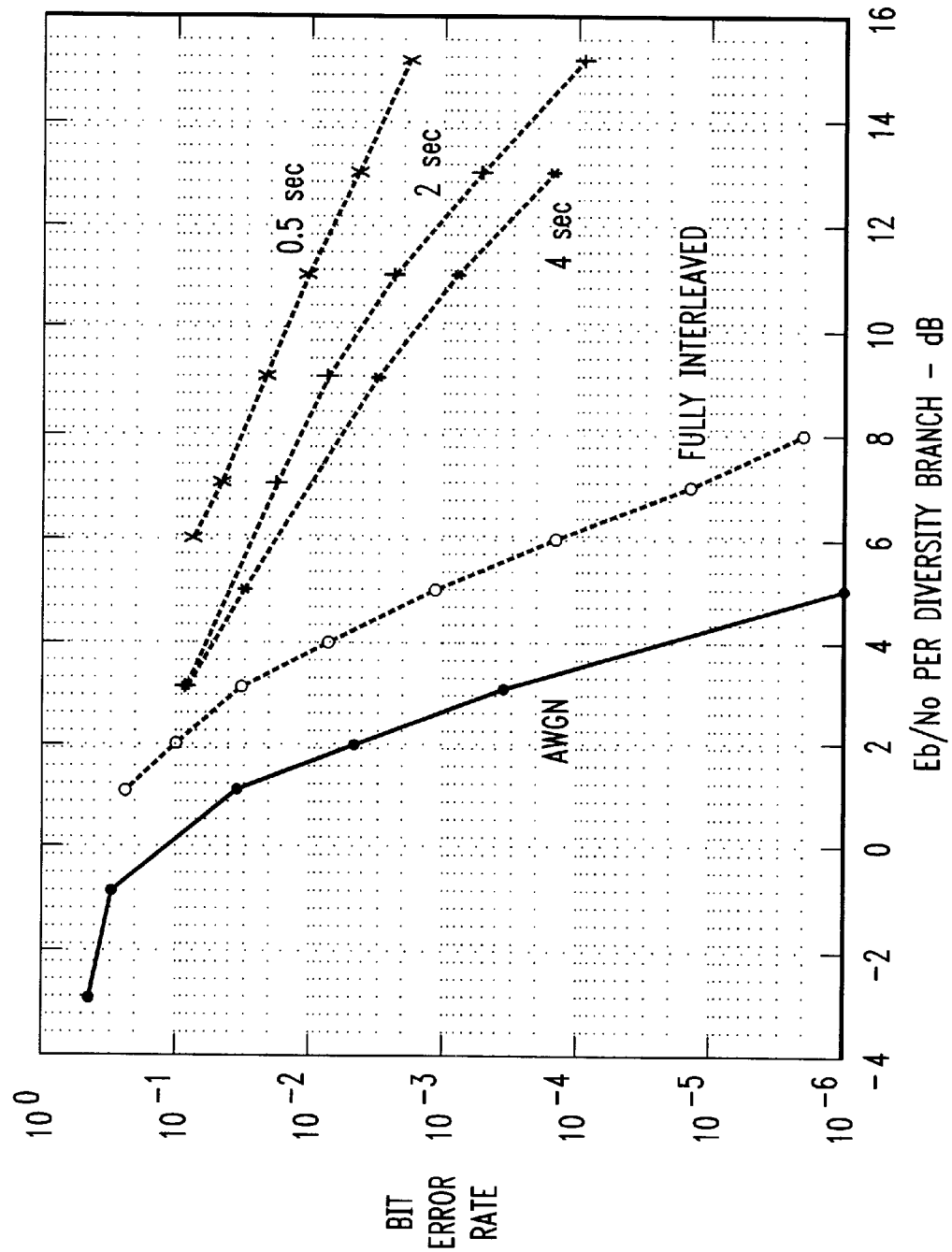
FIG. 1 is a graph illustrating a relation between different interleaver lengths and signal bit error rates.

As mentioned above, convolutional codes alone do not work well to correct noise burst errors produced over broadcast transmission channels that are subject to fading. Thus, typically a program source signal is first subjected to RS or other block-coding, and an interleaver is then used to scramble the block-coded signal prior to broadcasting it over a transmission channel. Received signals are de-interleaved over a corresponding interval, and then applied to a channel decoder at the receiver. An example of the effect of different interleaver time lengths on channel code performance is shown in FIG. 1, illustrating the performance of a one-half rate, 64-state convolutional code at a transmitter carrier frequency of 88 MHz, and with a Doppler frequency of 0.65 Hz. From FIG. 1, it is seen that, at a bit error rate (BER) of about $10^{-3}$ more than 5 dB loss in performance results if only a 0.5 second interleaver length is used, compared to performance obtained using a 4.0 second interleaver length. The performance loss becomes larger for lower BERs.

Thus, a large interleaver is desirable for optimal performance. But if a 4.0 second interleaver is used, a decoder at the receiver must first wait for a corresponding 4.0 second de-interleaver to output de-interleaved symbols before it can decode them. Thus, when a user first tunes the receiver to a program, or switches from one program to another, the 4.0 second de-interleaver in the receiver must be filled before decoding can begin. That is, the user must wait at least 4.0 seconds each time he/she tunes to a program, before being able to reproduce the program and decide whether or not to stay tuned.

Figure 2:
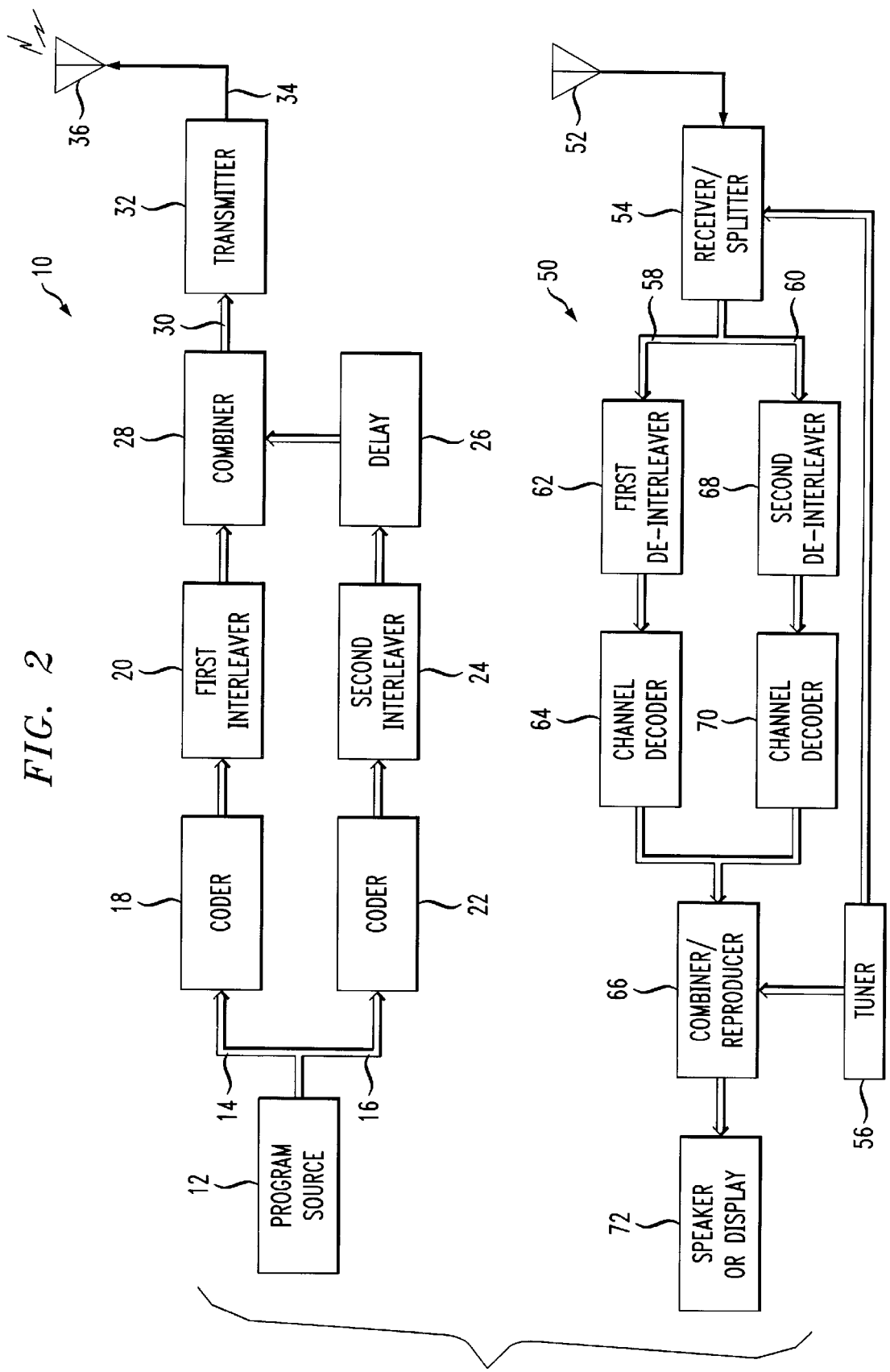
FIG. 2 is a schematic block diagram of a transmitter and a receiver according to the invention.

A basic implementation of the invention is shown in FIG. 2. In FIG. 2, a transmitter system 10 includes a program source 12 which may be, for example, a source of audio information in the case of a broadcast radio program, or a combination of audio and video information in the case of a television or multi-media broadcast. Signals output from the program source 12 are divided into associated program source signal streams 14, 16 representing the original program source 12 in the form of, for example, digital signals having a prescribed format.

Source signal stream 14 is applied to an input of a first forward error correction (FEC) coder 18 which applies, e.g., a known RS block code to signal stream 14 for purposes of allowing bits or symbols of the stream which may be lost due to noise bursts during transmission, to be recovered. Coded signals output from the FEC coder 18 are applied to an input of a first interleaver 20 which is configured to scramble consecutive signal bytes or symbols of the coded signal stream over a first delay interval or length, to overcome expected effects of signal fading when the signals are broadcast over a given transmission channel.

Source signal stream 16 is applied to an input of a second FEC coder 22. An output of the coder 22 is applied to an input of a second interleaver 24. The second FEC coder 22 may be identical or similar to the coder 18, but such is not necessary to implement the present transmission scheme. The second interleaver 24 has a second delay interval or length shorter than that of the first interleaver 20, and, in certain applications, may be omitted altogether. Signals output from the second interleaver 24 are input to a signal delay stage 26. The delay stage 26 is configured to introduce a time delay to the coded and interleaved signal stream 16 which time delay is substantially equal to the length of the first interleaver 20. The time-delayed signal stream serves as a tuning signal stream to facilitate reproduction of the program source at the receiver system 50 when the system 50 is first tuned to the program source, as explained further below.

Output signals produced by the first interleaver 20, and by the delay stage 26, are applied to a combiner stage 28 which operates to produce an output signal stream 30 from which the two applied signal streams can be recovered upon reception. For example, the combiner stage 28 may be constructed and arranged in a known manner to modulate the two applied signals on a common carrier signal, and to produce the modulated carrier signal in the output signal stream 30. The output signal stream 30 is applied to a conventional radio frequency (RF) transmitter 32 which sends a RF signal containing the output signals from the first interleaver 20 and the delay stage 26 over a transmission line 34, to be radiated as program signals from an antenna 36.

A receiver system 50 in FIG. 2 includes an antenna 52 for responding to the program signals radiated from the transmitter antenna 36. Antenna 52 is coupled to an input of a receiver/splitter stage 54. The stage 54 is constructed and arranged in a known manner to respond selectively to program signals radiated from the transmitter antenna 36 and induced in the receiver antenna 52 in response, for example, to manual operation of a tuner 56 by a user.

The tuner 56 may include, for example, a number of buttons, knobs or the like (not shown) which when operated by the user cause the receiver/splitter stage 54 to tune to desired program signals on corresponding transmission channels, and to demodulate program signal streams associated with the program signals to which the stage 54 is tuned. For example, in the embodiment of FIG. 2, the receiver/splitter stage 54 produces a first signal stream 58 and a second signal stream 60. The streams 58, 60 correspond to the signal streams applied to the combiner stage 28 of the transmitter system 10. That is, signal stream 58 corresponds to signals produced by the first interleaver 20, and signal stream 60 corresponds to signals produced by the delay stage 26.

Signal stream 58 is applied to an input of a first de-interleaver 62. The de-interleaver 62 is configured to unscramble signal bytes or symbols that were scrambled over the first delay interval of the first interleaver 20, to overcome signal losses due to fading over the transmission channel. An output of the first de-interleaver 62 is applied to an input of a first channel decoder 64 which is configured to decode the input signals according to the coding scheme used by the first FEC coder 18 of the transmitter system 10. Output signals from the channel decoder 64 are applied to an input of a combiner/reproducer stage 66.

Signal stream 60 from the receiver/splitter stage 54 is applied to an input of a second de-interleaver 68. The signal stream 60 thus corresponds to the tuning signal stream output from the delay stage 26. The de-interleaver 68 is configured to unscramble signal bytes or symbols that were scrambled over the second delay interval of the second interleaver 24. Should the second de-interleaver 24 be omitted from the transmitter system 10, the second de-interleaver 68 can likewise be omitted from the receiver system 50.

An output of the second de-interleaver 68 (or the signal stream 60 if the de-interleaver 68 is omitted), is applied to an input of a second channel decoder 70 which is configured to decode the input signals according to the coding scheme used by the second FEC coder 22 of the transmitter system 10. Output signals from the channel decoder 70 are applied to an input of the combiner/reproducer stage 66.

The combiner/reproducer stage 66 is also coupled with the tuner 56, and with a program reproducing device 72, e.g., a speaker, and if broadcast programs include video information, a display monitor. Operation of the combiner/reproducer stage 66 is thus in part responsive to operation of the tuner 56.

Specifically, in the illustrated embodiment, if the tuner 56 is at a steady state, e.g., set at one channel position for more than a predetermined time interval, the combiner/reproducer stage 66 responds to the output of the first channel decoder 64 alone, or in combination with the output of the second channel decoder 70. The program source 12 is therefore reproduced based on information from the source signal stream 14 alone, or combined with information from the source signal stream 16. A program reproduction delay corresponding to the length of the first de-interleaver 62 will be introduced by the receiver system 50, however. As mentioned, such a delay may be in the order of many seconds.

If tuner 56 is first being set to a desired program channel, or switched from one program channel to another, such operation of the tuner 56 is detected by the combiner/reproducer stage 66, and the stage 66 is configured to respond only to the output of the second channel decoder 70. The program source 12 is then reproduced based only on information from the source signal stream 16, and the program reproduction delay is reduced to that inserted by the second de-interleaver 68 (if any). Accordingly, the user of the receiver system 50 is able to obtain a reproduction of the program source 12 with minimal delay when tuning or switching among program channels, albeit without the benefit of the convolutional coding provided by the first interleaver 18 at the transmitter system 10. After a desired program channel is tuned and reproduced, and the user no longer operates the tuner 56 for the predetermined interval, the combiner/reproducer stage 66 determines that the tuner 56 is at the steady state and resumes reproduction of the output of the first channel decoder 64.

Figure 3:
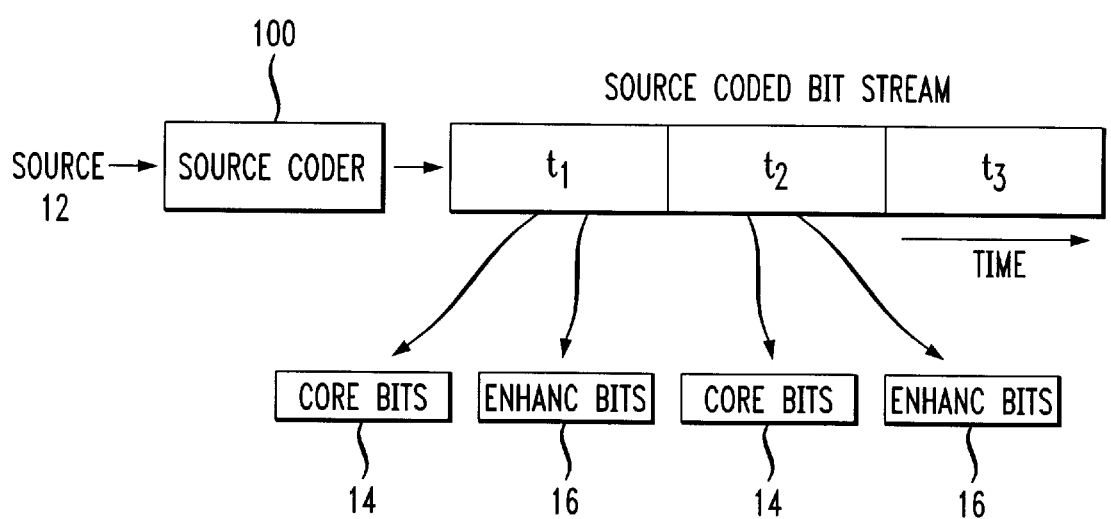
FIG. 3 is a block diagram of an embedded source coder that can be used in the transmitter in FIG. 2.

In the embodiment of FIG. 2, if the signals output from the program source 12 are divided into two equal source signal streams 14, 16 each at a rate of n bits-per-second (bps), then a total of 2n bps must be combined and transmitted by the transmitter system 10 to define the two streams. To achieve greater bandwidth efficiency, an implementation shown in FIG. 3 may be incorporated in the transmitter system 10. This implementation makes use of an embedded or multiple description source coder 100. See M. T. Orchard, et al., "Redundancy Rate-Distortion Analysis of Multiple Description Coding Using Pairwise Correlating Transforms", Proc. IEEE Int. Conf. On Image Processing (1997). All relevant portions of this article are incorporated by reference herein. Such coders provide multiple streams to describe the same source signal. If one of the streams, for example, a core bit stream in the case of an embedded encoder is used for the source signal stream 14, the stream 14 will be sufficient to allow reproduction of the program source 12 with at least recognizable quality. If both the core bit stream 14, and an enhancement bit stream 16 from the coder 100 are received, de-interleaved and decoded, information from both bit streams may be combined in the receiver system 50 by the combiner/reproducer stage 66 to obtain a higher quality reproduction. In the latter case, the different streams 14, 16 may be subjected to the same or to different correction codes at the transmitter system 10, interleaved using interleavers 20, 24 of different lengths, and then transmitted.

Although the presently disclosed scheme does not preclude the use of any particular source coder 100, or any number of source signal streams 14, 16, assume for purposes of illustration that a scalable coder such as described in J. Herre, et al., "The Integrated Filterbank Based Scalable Mpeg-4 Audio Coder", 105th Audio Engineering Society (AES) Convention (September 1998), is used. All relevant portions of this publication are incorporated herein by reference. In such an application, coder 100 provides a core layer and one or more enhancement layers. While the core layer signal bit stream 14 is independently decodable, the enhancement layer bit stream 16 provides a higher quality reproduction when decoded. The bit stream 14 obtained from the core layer is denoted as core bits (CB) in FIG. 3. The bit stream 16 containing just the enhancement bits, or all of the core bits and the enhancement bits, is denoted generally as enhancement bits (EB).

The CB stream 16 is input to the second interleaver 24 (or directly to delay stage 26 if interleaver 24 is omitted), and is decoded first when the receiver system 50 initially tunes to an associated transmission channel. Signals corresponding to the CB stream 16 are applied to the de-interleaver 68 (or directly to channel decoder 70) at the time of initial receiver tuning, or re-tuning. Thus, a "core" reproduction of the program source 12 may be readily reproduced for purposes of tuning and program selection by a user of the receiver system 50. If the transmission paths of program signals from the system 10 do not exceed line-of-sight to most of the intended receivers, signal fading may not be an important consideration in which case the second interleaver 24 and the second de-interleaver 68 can be omitted. Such would allow a nearly instantaneous core reproduction of the program source at the receiver system 50 for tuning purposes once the CB stream 16 is received.

At the transmitter system 10, the EB stream 14 is input to the first interleaver 20 having a time delay length sufficient to overcome expected fading in the transmission channel. The de-interleaver 62 at the receiving system 50 has a corresponding length, and signals corresponding to the EB stream 14 are applied to the de-interleaver 62, either at the time of initial receiver tuning or shortly thereafter. In a steady state, the program reproduction delay will be longer, but the quality of the reproduction will be higher.

In sum, when the receiver system 50 is first turned to a program transmission channel, the CB stream 16 is decoded and reproduced with relatively little delay. Afterward, in the steady state, the receiver system 50 decodes the EB stream 14, or combines the two decoded streams, to obtain a high quality reproduction of the program source.

Synchronization of transmission of the core bit signal streams with the enhancement bit signal streams, will now be discussed. Assume that when the tuner 56 is first tuned to a program transmission channel, a tolerable "wait" time for a core reproduction is 400 msec. Also assume that at a steady state, a real-time end-to-end delay (from program source 12 to reproduction at 72) is around nine seconds. Thus, the core bit stream may be subjected to interleaver/de-interleaver lengths of 400 msec each, and the enhancement bit stream can be subject to interleaver/de-interleaver lengths of 4.0 seconds each. To synchronize the two streams when they correspond to the same segment of program source signals, transmission of the CB stream 16 must therefore be delayed by 4.0 seconds with respect to the EB stream 14.

Figure 4:
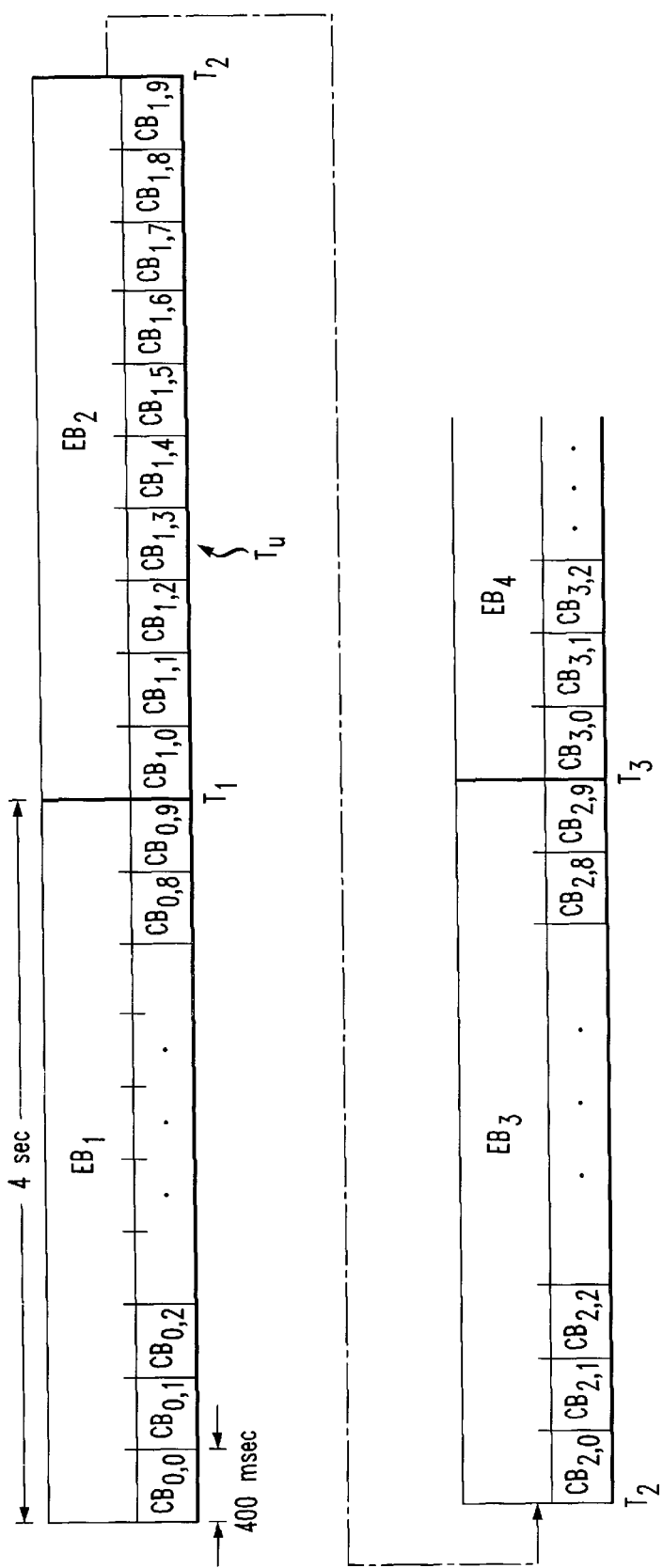
FIG. 4 is a timing diagram showing a relation between transmissions of two signal streams from the transmitter in FIG. 1.

Referring to FIG. 4, when tuner 56 first tunes to a channel at time $T_u$, it starts decoding the core bits $CB_{1,4}$ within 400 msec at $T_1+2.0$ sec. The combiner/reproducer stage 66 then combines the CB stream, at $CB_{3,0}$, with the EB stream, at $EB_3$, all at $T_3+0.4$ secs, and reproduces the combined streams in an optimal manner to obtain a high quality reproduction of the original program source corresponding to source segment $t_3$ (see FIG. 3). Thus, within 6.4 seconds after first tuning to a program transmission channel, the receiver system 50 decodes and reproduces the program source 12 with greatest quality. A detailed time delay analysis is given further below.

Figure 5:
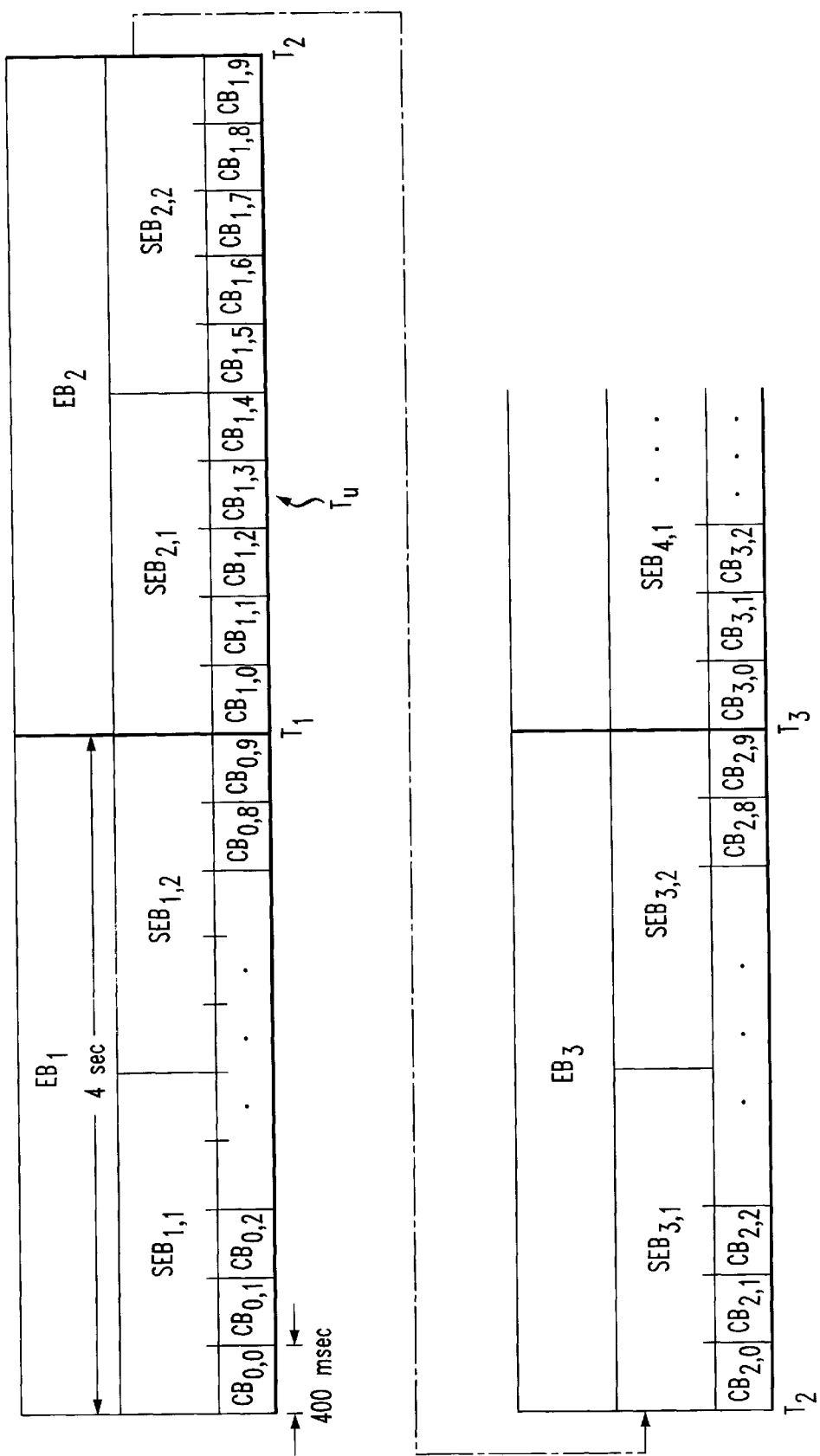
FIG. 5 is a timing diagram showing a relation among transmissions of three signal streams.

A more graceful increase in decoded signal quality may be obtained, for example, by using three different signal streams as illustrated in FIG. 5. Such would require a third interleaver at the transmitter system 10 and a third de-interleaver at the receiver system 50. In FIG. 5, a third source signal bit stream is subjected to a 2.0 second interleaver length, and is denoted as a second enhancement bit stream (SEB). Similar to the two-stream example above, when the tuner 56 first tunes to a channel at time $T_u$, it starts decoding the core bits $CB_{1,4}$ within 400 msec of reception. At time $T_2+2.4$ sec (within 4.4 sec), however, a higher quality reproduction can be obtained by combining the core bit stream, at $CB_{2,5}$ with the SEB stream, at $SEB_{2,2}$. At $T_3+0.4$ sec, the core bit stream $CB_{3,0}$ may be combined with the SEB stream, at $SEB_{3,1}$, and with the EB stream, at $EB_3$, to obtain a highest quality program reproduction. This is easily generalized to a K-stream case, with the kth stream subjected an interleaver of size $n_k$, where (k=1,2, ... k) and ($n_i<n_j$) for (i<j).

Delay Analysis

Figure 6:
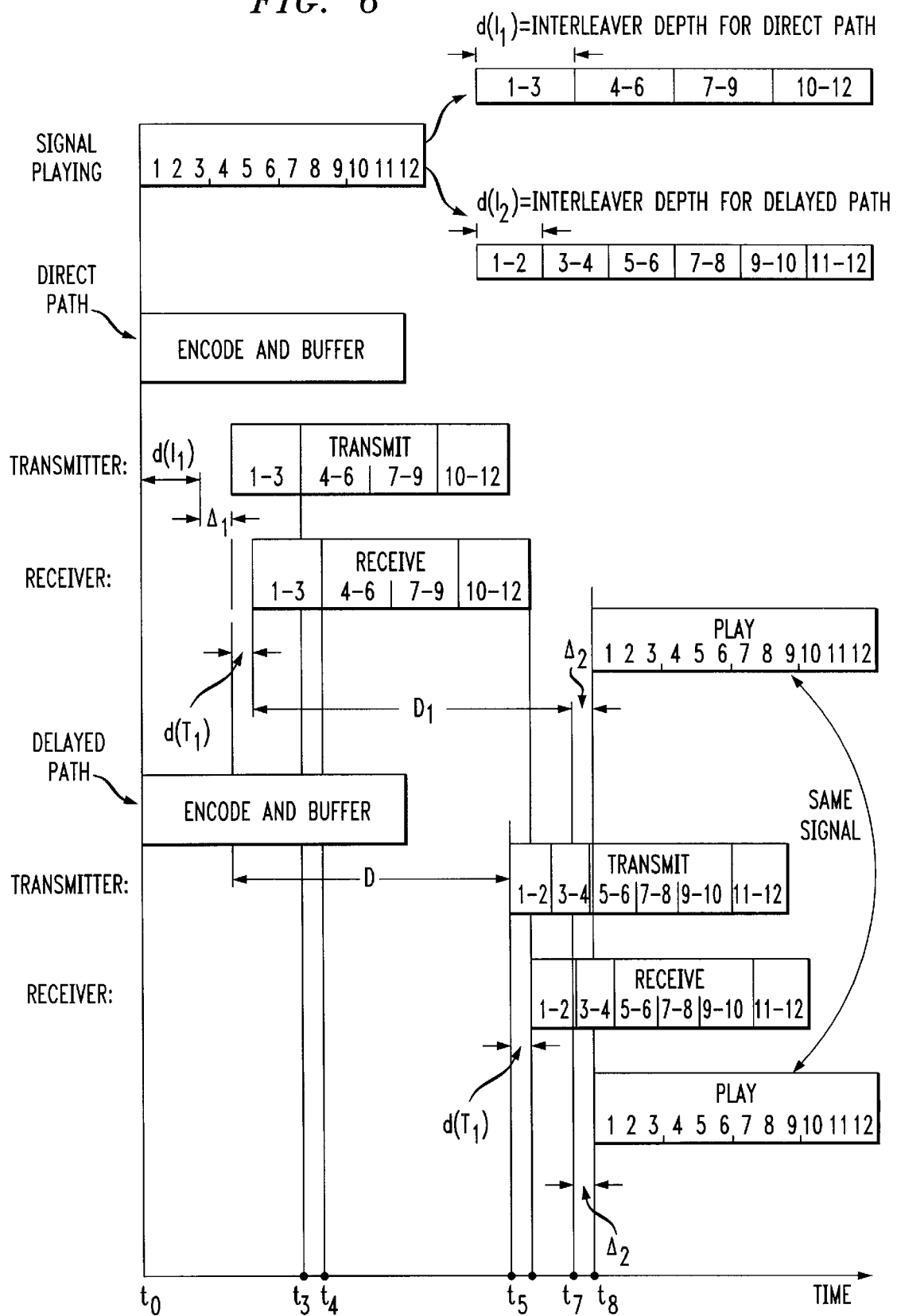
FIG. 6 is an illustration of a real-time delay analysis applied to the transmissions of two signal streams as in FIG. 4.

The real-time delay beginning from when a source signal is first produced at a transmitter, to the time the signal is decoded and reproduced by a receiver, may be calculated as follows:

The following definitions and assumptions are used (see FIG. 6):

$d(I_1)$=Interleaver depth for direct path $d(I_2)$=Interleaver depth for delayed path D=delay between transmission of the two paths $D_1$=time from when the direct path signal is first received to time it is decoded at the receiver $d(T_1)$=propagation delay from transmitter to receiver $\Delta_1$=processing delay at transmitter $\Delta_2$=processing delay at receiver From FIG. 6, it is seen that

| | |
|---|---|
| $t_3 = d(I_1) + \Delta_1 + d(I_1) = 2d(I_1) + \Delta_1$ | (1st interleaved frame transmitted) |
| $t_4 = t_3 + d(T_1)$ | (1st interleaved frame received from direct path) |
| $t_5 = d(I_1) + \Delta_1 + D$ | (Start transmission of 1st frame from delayed path) |
| $t_7 = t_5 + d(T_1) + d(I_2)$ | (1st frame received from delayed path, start decoding the combined signal) |
| $t_8 = t_7 + \Delta_2$ | (start of signal reproduction at receiver) |
| $= d(I_1) + \Delta_1 + D + d(T_1) + d(I_2) + \Delta_2$ | |

Thus, $t_8$ is the real-time delay from the time a program signal is first produced at the transmitter, to the time when the signal is reproduced at the receiver. That is, $t_8 = d(I_1)+d(I_2)+D+d(T_1)+\Delta_1+\Delta_2$ =time from start of source signal at transmitter to time the signal is reproduced at receiver For example, if $d(I_1)$=D=4 sec, and $d(I_2)$=400 msec, $d(T_1)$=0 sec $t_8$=8.8 +$\Delta_1+\Delta_2$ seconds.

If the delayed path is used for tuning, the tuning delay, $t_{tune}$ is $t_{tune}=2\times d(I_2)+\Delta_2$=maximum tuning delay.

Application to Multiple Access Schemes

The disclosed transmission scheme may be applied to a satellite broadcasting system using a code division multiple access (CDMA), or other multiple access scheme. Apart from delaying transmission of bits in a tuning stream relative to bits of other transmitted streams, the bits of the different streams pertaining to different program segments can be transmitted over a common time slot or frequency band. In a coded orthogonal frequency division multiple access (OFDM) system, different bit streams may be transmitted through different frequency bands to obtain benefits of frequency diversity.

The foregoing discloses a robust transmission technique, in which forward error correction codes and different interleaver lengths are applied to source signal streams, both to combat fading during transmission, and to enable a low-delay tuning mode for a receiver. Because a relatively large interleaver length at the transmitter can result in a long decoding delay at the receiver, a smaller interleaver is applied to a separate source signal stream at the transmitter to facilitate tuning of the receiver when initially tuning or sampling different programs. Coding and synchronization of the transmitted streams, and delay implications of the technique, have been analyzed. Applications of the technique to different multiple access schemes were also noted. Components of the transmitter and the receiver systems 10, 50, may be selected from among commercially available devices, including but not limited to programmable digital signal processing (DSP) integrated circuits. Application specific integrated circuits (ASICs) may also be fabricated to carry out certain functions of the system components, as will be understood by those skilled in the art.

While the foregoing description represents preferred embodiments of the invention, it will be obvious to those skilled in the art that various changes and modifications may be made, without departing from the true spirit and scope of the invention as pointed out by the following claims. For example, while the embodiment of FIG. 2 operates to modulate and to de-modulate different signal streams on one program transmission channel, the signal streams may be transmitted and received on separate, corresponding channels.

We claim:

1. A method of transmitting program source signals in a manner that facilitates tuning of a receiver on a channel over which the signals are transmitted, comprising:

producing a first and a second source signal stream each corresponding to a common program source;

applying a first error correction code having a first correction delay to the first source signal stream, thus producing a first error-corrected source signal stream;

transmitting the first error-corrected source signal stream for reception by a receiver; and transmitting a tuning signal stream corresponding to the second source signal stream for reception by the receiver at a determined timing relative to transmission of the first error-corrected signal stream.

2. The method of claim 1, including applying a second error-correction code having a second correction delay shorter than said first correction delay to the second source signal stream, to form said tuning signal stream.

3. The method of claim 2, including applying the second error correction code by using a second interleaver.

4. The method of claim 1, including delaying transmission of the tuning signal stream relative to the first error-corrected signal stream by an interval corresponding to said first correction delay.

5. The method of claim 1, including applying a scalable coder to an output of the program source, and producing the first source signal stream from an enhancement layer output of the scalable coder.

6. The method of claim 5, including producing the second source signal stream from a core layer output of the scalable coder.

7. The method of claim 1, including applying the first error correction code by using a first interleaver.

8. The method of claim 1, including modulating the first error-corrected source signal and the tuning signal on a common carrier signal for transmission.

9. A method of receiving program source signals in a manner that facilitates tuning of a receiver on a channel over which the signals are transmitted, comprising:

receiving an error-corrected signal stream associated with a program source;

receiving a tuning signal stream associated with the program source; and reproducing a signal stream corresponding to the tuning signal stream while operating a tuner for selecting the program source for reproduction.

10. The method of claim 9, including reproducing a signal stream corresponding to the error-corrected signal stream beginning a certain time after operation of said tuner.

11. The method of claim 9, including applying the error-corrected signal stream to a first de-interleaver having a first correction delay.

12. The method of claim 11, including applying said tuning signal stream to a second de-interleaver having a second correction delay that is shorter than said first correction delay.

13. The method of claim 9, including combining the signal stream corresponding to said tuning signal stream and the signal stream corresponding to the error-corrected signal stream for reproduction, beginning a certain time after operation of said tuner.

14. A system for transmitting program source signals in a manner that facilitates tuning of a receiver on a channel over which the signals are transmitted, comprising:

a first encoder stage configured to apply a first error correction code to a first source signal stream associated with a program source, and to produce a corresponding first error-corrected source signal stream with a first correction delay; and a transmitter stage;

wherein the transmitter stage is constructed and arranged to transmit said first error-corrected source signal stream for reception by a receiver; and said transmitter stage is also constructed and arranged to transmit a tuning signal stream corresponding to a second source signal stream associated with the program source, for reception by the receiver at a determined timing relative to transmission of the first error-corrected signal stream.

15. A system according to claim 14, including a second encoder stage configured to apply a second error correction code to the second source signal stream to form said tuning signal stream with a second correction delay that is shorter than said first correction delay.

16. A system according to claim 15, wherein the second encoder stage is a second interleaver.

17. A system according to claim 14, including a delays stage coupled to the second encoder stage and the transmitter, wherein the delay stage is configured to delay transmission of the tuning signal stream relative to the first error corrected signal stream by an interval corresponding to said first correction delay.

18. A system according to claim 14, including a scalable coder constructed and arranged to produce the first source signal stream from an enhancement layer output of the scalable coder in response to an input program source.

19. The system of claim 18, wherein the scalable coder is configured to produce the second source signal stream from a core layer output of the scalable coder.

20. A system according to claim 14, wherein the first encoder stage is a first interleaver.

21. A system according to claim 14, wherein said transmitter includes a modulator constructed and arranged to modulate the first error-corrected source signal stream and the tuning signal stream on a common carrier signal for transmission.

22. A system for receiving program source signals in a manner that facilitates tuning of a receiver on a channel over which the signals are transmitted, comprising:

a receiver stage;

wherein said receiver stage is constructed and arranged to respond to an error-corrected signal stream associated with a program source, and said receiver stage is also constructed and arranged to respond to a tuning signal stream associated with the program source;

a tuner coupled to the receiver stage; and a program source reproducing stage coupled to said tuner and to the receiver stage;

wherein said reproducing stage is configured to reproduce a signal stream corresponding to the tuning signal stream when the tuner is initially operated by a user for selecting the program source for reproduction.

23. A system according to claim 22, wherein said reproducing stage is constructed and arranged to reproduce a signal stream corresponding to the error-corrected signal stream beginning a certain time after operation of said tuner.

24. A system according to claim 22, wherein the receiver stage includes a first de-interleaver having a first correction delay for de-interleaving the error-corrected signal stream.

25. The system of claim 24, wherein the receiver stage includes a second de-interleaver having a second correction delay that is shorter than said first correction delay for de-interleaving said tuning signal stream.

26. A system according to claim 22, wherein the reproducing stage includes a combining stage that is constructed and arranged to combine the signal stream corresponding to the tuning signal stream and the signal stream corresponding to the error-corrected signal stream for reproduction, beginning a certain time after operation of said tuner.

* * * * *